(12) United States Patent
Soerensen

(10) Patent No.: US 12,291,433 B2
(45) Date of Patent: May 6, 2025

(54) TRANSPORT APPARATUS

(71) Applicant: Siemens Gamesa Renewable Energy A/S, Brande (DK)

(72) Inventor: Johnny Soerensen, Videbæk (DK)

(73) Assignee: SIEMENS GAMESA RENEWABLE ENERGY A/S, Brande (DK)

( * ) Notice: Subject to any disclaimer, the term of this patent is extended or adjusted under 35 U.S.C. 154(b) by 288 days.

(21) Appl. No.: 17/770,100

(22) PCT Filed: Oct. 9, 2020

(86) PCT No.: PCT/EP2020/078455
§ 371 (c)(1),
(2) Date: Apr. 19, 2022

(87) PCT Pub. No.: WO2021/078543
PCT Pub. Date: Apr. 29, 2021

(65) Prior Publication Data
US 2022/0388815 A1 Dec. 8, 2022

(30) Foreign Application Priority Data
Oct. 24, 2019 (EP) ..................................... 19205054

(51) Int. Cl.
*B66C 1/56* (2006.01)
*B66C 1/46* (2006.01)
(Continued)

(52) U.S. Cl.
CPC .................. *B66C 1/56* (2013.01); *B66C 1/46* (2013.01); *B66C 1/62* (2013.01); *B66C 1/108* (2013.01); *B66C 1/427* (2013.01)

(58) Field of Classification Search
CPC .... B66C 1/56; B66C 1/46; B66C 1/62; B66C 1/108; B66C 1/427; B66C 1/54; F03D 13/10; F03D 13/25; F03D 13/40
See application file for complete search history.

(56) References Cited

U.S. PATENT DOCUMENTS 5,419,427 A * 5/1995 Wurgler .................... B66C 1/54
  294/902
6,354,644 B1 * 3/2002 Zaguroli, Jr. ............. B66C 1/54
  294/93
(Continued)

FOREIGN PATENT DOCUMENTS

AT       A167574 A     11/1975
CN     106144149 A     11/2016
(Continued)

OTHER PUBLICATIONS

PCT International Search Report and Written Opinion of International Searching Authority mailed Jan. 21, 2021 corresponding to PCT International Application No. PCT/EP2020/078455 filed Oct. 9, 2020.

*Primary Examiner* — Stephen A Vu
(74) *Attorney, Agent, or Firm* — Schmeiser, Olsen & Watts LLP

(57) ABSTRACT

A transport apparatus for use in the transport of a heavy structure includes a shape-adjustable adapter realized to adjust between an initial shape and a mating shape; and an actuator configured to effect a change in shape of the shape-adjustable adapter into its initial shape to facilitate positioning of the adapter relative to the structure; and to effect a change in shape of the shape-adjustable adapter into its mating shape to engage the shape-adjustable adapter with a surface of the structure. A method of securing a frusto-conical structure during transport is further provided.

14 Claims, 5 Drawing Sheets

(51) Int. Cl.
*B66C 1/62* (2006.01)
*B66C 1/10* (2006.01)
*B66C 1/42* (2006.01)

(56) References Cited

U.S. PATENT DOCUMENTS

| | | | |
|---|---|---|---|
| 11,008,073 B2 * | 5/2021 | Hammer | B63B 25/18 |
| 2002/0096897 A1 * | 7/2002 | Comardo | B66C 1/447 |
| | | | 294/95 |
| 2003/0038493 A1 * | 2/2003 | Harris | B66C 1/54 |
| | | | 294/97 |
| 2018/0257914 A1 | 9/2018 | Franke | |

FOREIGN PATENT DOCUMENTS

| | | |
|---|---|---|
| CN | 108622789 A | 10/2018 |
| CN | 108821105 A | 11/2018 |
| CN | 110228752 A | 9/2019 |
| DE | 234407 A1 | 4/1996 |
| EP | 1813473 A2 | 8/2007 |
| EP | 2910686 A2 | 8/2015 |
| EP | 3255210 A2 | 12/2017 |
| EP | 3372549 A1 | 9/2018 |
| EP | 3771825 A1 | 2/2021 |
| EP | 3792486 A1 | 3/2021 |
| JP | H068179 A | 1/1994 |
| JP | H0730212 U | 6/1995 |
| JP | 2000086144 A | 3/2000 |
| WO | WO 2008152101 A1 | 12/2008 |
| WO | 2009141018 A2 | 11/2009 |
| WO | WO 2010048560 A2 | 4/2010 |
| WO | 2010124744 A1 | 11/2010 |
| WO | WO 2018041663 A1 | 3/2018 |

* cited by examiner

TRANSPORT APPARATUS

CROSS-REFERENCE TO RELATED APPLICATIONS

This application claims priority to PCT Application No. PCT/EP2020/078455, having a filing date of Oct. 9, 2020, which claims priority to EP Application No.19205054.0, having a filing date of Oct. 24, 2019, the entire contents both of which are hereby incorporated by reference.

FIELD OF TECHNOLOGY

The following relates to a transport apparatus, and a method of securing a structure during transport.

BACKGROUND

For large tubular structures such as towers or tower sections that are manufactured at one location and installed at a different location, it is necessary to transport the structures safely. It has been known from the prior art to transport wind turbine tower sections (or complete towers) horizontally. However, it can be desirable to transport such tubular structures vertically. Particularly in the case of structures that are transported by a marine vessel, it is advantageous to optimise use of the limited available space on deck.

It has been widespread practice to manufacture such towers or tower sections with upper and lower flanges so that a tower can be bolted to a support structure and/or so that a tower section can be bolted to another tower section. One way of transporting such a tubular structure in a vertical orientation is to bolt its lower flange to a support fixture, for example to a support fixture mounted on the deck of a ship used to transport the tower to its destination. For a tower with a diameter in the order of several metres, this can require hundreds of fasteners. When preparing a wind park for installation, it may be necessary to transport several such towers or tower sections, and it can be time-consuming and therefore expensive to secure all towers to their respective support fixtures.

Furthermore, a tower may not always comprise flanges or flanged sections. Instead, tower sections may be joined by a slip-joint that is devoid of any fasteners, and in which the connection is essentially maintained by friction. Similarly, the lower end of a tower may be connected to a support structure by a slip-joint, instead of bolting it to the support structure. A slip-joint can be relatively easy to implement and may be significantly cheaper since there is no need to provide flanges, through-holes, bushings, fasteners, etc. However, the absence of any flange presents a problem during transport, since the flangeless tubular structure no longer has any part that can be bolted to a support fixture. To secure such a structure during transport over longer distances, it may be necessary to provide a temporary flange to convey stiffness to the structure and to secure the structure to the transport means. These measures add to the overall cost of transport.

An aspect relates to provide an improved and more economical means of transporting such flangeless tubular structures.

SUMMARY

The transport apparatus is suitable for use in the transport of a heavy hollow structure such as a wind turbine tower, a wind turbine tower section, etc. The transport apparatus can support or fixate the structure during transport from one location to another, or may be used as a tool of a lifting apparatus to lift the structure from one site to another.

According to embodiments of the invention, the transport apparatus comprises a shape-adjustable adapter realised to adjust between an initial shape and a mating shape; and an actuator configured to effect a change in shape of the shape-adjustable adapter into its initial shape to facilitate positioning of the adapter relative to the structure, and to effect a change in shape of the shape-adjustable adapter into its mating shape to engage the shape-adjustable adapter with a surface of the structure.

Once the shape-adjustable adapter of the transport apparatus has been actuated to assume its mating shape, the transport apparatus effectively engages with the structure so that the transport apparatus and the structure can be handled as a single entity. Since the transport apparatus is a device that facilitates transport of the structure, it may be regarded as a tool, and the terms "transport apparatus" and "transport tool" may be used interchangeably in the following.

The inventive transport tool may be used for various modes of transport of a heavy payload, including on-site transport (e.g. within a manufacturing location such as a steelyard); overland transport from one location to another (e.g. from steelyard to quayside); marine transport (e.g. from quayside to offshore installation site).

An advantage of the inventive transport tool according to embodiments of the invention is that it can be secured to the structure without any fasteners. This is in favourable contrast to the prior art approach, in which a tower section must be bolted to a support fixture of a transport vessel or to a lifting fitting of a crane.

The inventive method of securing a structure, in particular a structure with a frusto-conical slip-joint interface, during transport comprises at least the steps of providing such a transport apparatus; controlling the actuator to effect a change in shape of the shape-adjustable adapter into its initial shape; positioning the adapter relative to the structure; and engaging the shape-adjustable adapter with the structure by controlling the actuator to effect a change in shape of the shape-adjustable adapter into its mating shape.

Because of the straightforward manner in which the transport tool can be secured to the load or structure, the inventive method can significantly reduce the costs associated with the transport of any heavy and cumbersome structure such as a wind turbine tower section, a wind turbine transition piece, a wind turbine foundation part etc., and such transport procedures can be made easier and cheaper.

In the following, without restricting embodiments of the invention in any way, it may be assumed that the structure being transported is a wind turbine part such as a hollow wind turbine tower or tower section. For the sake of clarity, the structure being transported may be referred to in the following as the "payload". It may also be assumed that the payload is not equipped with a flange for bolting it to some other structure. Instead, it may be assumed that the payload is flangeless and that it is shaped to mate with another structure by a slip-joint. The term "slip-joint" as used in the context of embodiments of the invention shall be understood to be a flangeless fastener-free joint between a first structure and a second structure, wherein each structure comprises an essentially tubular or cylindrical interface portion, and wherein one of the interface portions is shaped to fit exactly into the other interface portion. For example, a wind turbine transition piece, mounted on a marine foundation, can be constructed to have a frustoconical interface portion that extends upwards. This first interface portion is dimensioned so that its outer surface fits essentially exactly inside a complementary frustoconical interface portion at the lower end of a wind turbine tower. To install the tower onto the transition piece, it need only be lowered into place so that the complementary interface portions form the slip-joint. The weight of the tower is sufficient to secure a robust connection. The term "frustoconical" is used in its accepted sense, i.e. having the shape of a frustum of a cone.

The shape-adjustable adapter may be understood to be an essentially cylindrical body of variable diameter that will fit over the payload during transport, or that will fit inside the payload during transport. The shape-adjustable adapter has an essentially circular cross-section between a "fixed" end and a variable end. The diameter at the fixed end will remain constant. In one exemplary embodiment of the invention, the diameter at the variable end of the shape-adjustable adapter is larger in the mating state than in the initial state. In an alternative embodiment of the invention, the diameter at the variable end is smaller in the mating state than in the initial state.

The shape-adjustable adapter can be realised in any suitable way. In one exemplary embodiment of the invention, the shape-adjustable adapter is made by linking together a number of plates. The plates may all have the same form, for example curved trapezoids. When in the relaxed or initial state, the plates are furled so that the adapter has an overall cylindrical shape with essentially the same diameter at both ends. So that it can alter its shape, the adapter further comprises an actuator-controlled mechanism that is configured to effect the change in shape of the shape-adjustable adapter between the initial shape and the mating shape. For a "linked plate" realisation, such a mechanism is realised to spread the plates at the variable end. Such a mechanism may be realised using any suitable means to move the linked plates of the adapter between its initial shape and its mating shape. The actuator-controlled mechanism exerts sufficient force to hold the adapter in its mating shape during transport of the structure. In this way, the transport tool engages with the payload solely by friction during transport, so that no fasteners of any kind are required to connect the transport tool to the payload.

When the adapter is in its mating shape, its mating surface is pressed against the complementary surface of the structure. This alone may be sufficient to ensure that the structure does not slip or move relative to the adapter during the transport procedure. However, in a particularly exemplary embodiment of the invention, the shape-adjustable adapter comprises a high-friction mating surface, i.e. the surface that lies against the surface of the structure.

In one exemplary embodiment of the invention, the shape-adjustable adapter comprises an inflatable mantle realized to assume the initial shape when deflated, and to assume the mating shape when inflated. The inflatable mantle can be supported by a rigid body. For example, if the adapter is to be placed inside the payload during transport, the inflatable mantle can be arranged about a rigid body that has an essentially cylindrical form. The inflatable mantle comprises an annular arrangement of a plurality of inflatable bodies such as inflatable bladders. Alternatively the inflatable mantle can be realised as one or more suitably formed dunnage bags. Of course, it is possible to combine the "inflatable mantle" device with the "linked plates" device described above.

Whether the transport tool is realized using linked plates, an inflatable chamber, or other mechanism, it can be realized to cover a favorably large range between its initial shape its mating shape. In this way, the tool can be used to secure different kinds of payload having different sizes.

The shape of the adapter will be adjusted once when fitting the adapter to the payload, and again when releasing the adapter from the payload. To this end, an actuator mechanism of the transport tool comprises a means of receiving commands from a control device such as a remote control unit, a hand-held controller, etc. In this way, a technician can control the engage/release procedures from a distance.

As indicated above, the transport tool can be used to support or fixate the payload during transport from one location to another. For example, the transport apparatus may be realised as a fixture on the deck of a transport vessel that is used to transport wind turbine structures as payload to an offshore installation site.

Equally, the transport tool can be used as a tool of a lifting apparatus to lift the payload from one location to another. For example, the transport apparatus may be realised as a lifting fitting that can be suspended from a heavy-duty lifting apparatus such as a crane.

A payload such as a wind turbine tower can have a mass of 200-1000 tonnes. A payload with such a high weight is considered to be a "heavy structure" in the context of embodiments of the invention. If such a heavy tower section is held by the transport tool during shipping, it may be difficult to lift the tower section off the transport tool again when the vessel has arrived at its destination. This is because the weight of the tower section may result in a type of "contact bond" between the mating surfaces. The contact bond may be so pronounced as to prevent a crane from raising the payload from the transport tool. To prevent such problems at the destination, the transport tool comprises a release means. In one exemplary embodiment, the release means is realised as an arrangement of hydraulic pistons that apply an upward force to a lower face or edge of the payload so that they act to push the payload upwards, for example while a crane is also lifting the payload from the transport tool.

BRIEF DESCRIPTION

Some of the embodiments will be described in detail, with reference to the following figures, wherein like designations denote like members, wherein.

DETAILED DESCRIPTION

Figure 1:
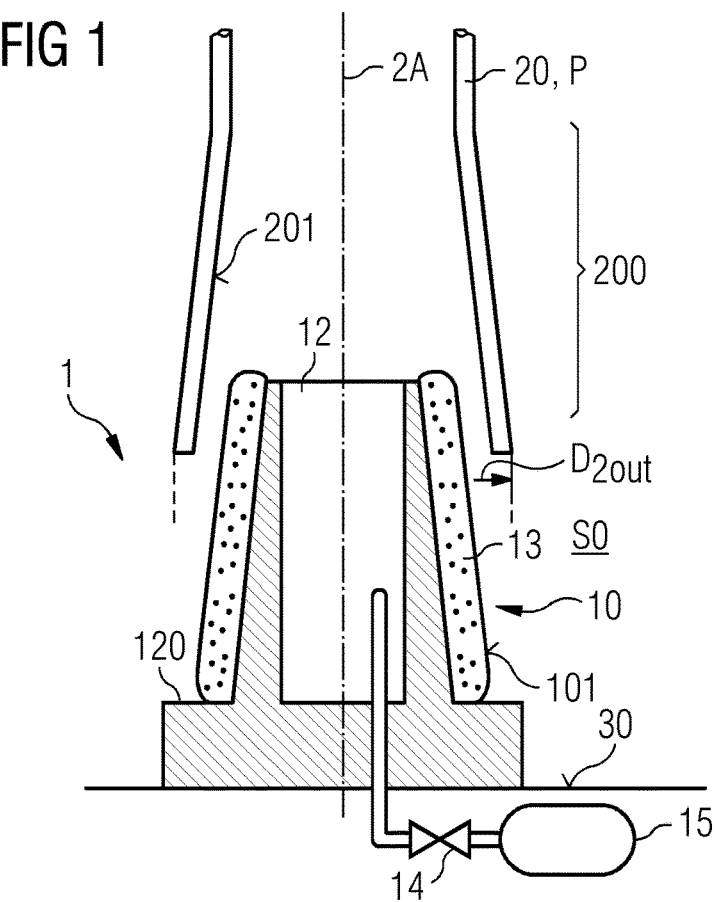
FIG. 1 is a schematic drawing showing an embodiment of the transport tool in a initial state.
Figure 2:
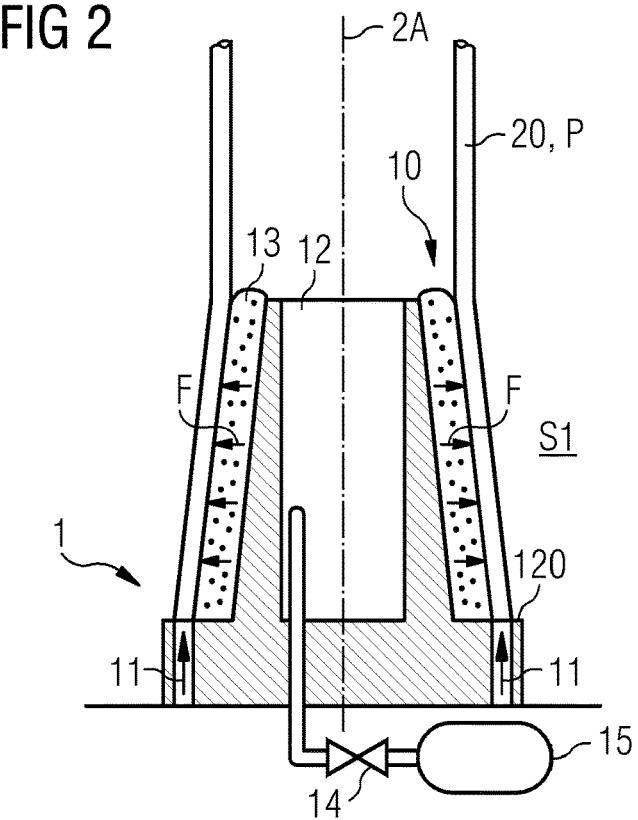
FIG. 2 is a schematic drawing showing an embodiment of the transport tool in a mating state.

FIG. 1 and FIG. 2 are simplified schematics showing an embodiment of the inventive transport tool 1 in its initial state S0 (initial shape) and also in its mating state S1 (mating shape). For the purposes of illustration, the diagram also indicates the lower end of an exemplary payload P, in this case a hollow tubular structure such as a wind turbine tower section 20. At its destination, the hollow tubular structure 20 will be mounted to a support or foundation (not shown) by means of a slip-joint, and the interface portion 20 of the hollow tubular structure 20 is therefore devoid of any flange or similar connecting interface. Instead, the surfaces 201 in the interface portion 20 of the hollow tubular structure 20 are essentially smooth in this embodiment, and have the shape of a frustum.

In this embodiment, the transport tool 1 is realised as a fixture 1 mounted on the deck 30 of a transport vessel which is used to transport the payload P to its target destination, and the shape-adjustable adapter 10 of the transport tool 1 is realised as an annular inflatable element 10 (which may be realised as one or more inflatable bags) and comprises a pressurized air assembly 14, 15 as an actuator to effect a change in shape of the inflatable element 10. It shall be assumed that the pressurized air assembly 14, 15 can be controlled by a technician to fill the inflatable element 10 with pressurized air when required, and to empty the inflatable element 10 when required. The skilled person will be familiar with such systems, which need not be explained in detail here. The inflatable element 10 has an annular form and is arranged about an inner rigid body 12. In this embodiment, the rigid body 12 has an annular pedestal portion 120 whose diameter is at least as large as the outer diameter $D_{2out}$ of the structure 20, so that the lower face of the structure 20 can rest on the pedestal 120.

FIG. 1 shows the inventive transport tool 1 in its initial shape S0 before engaging with the payload P, which can be lowered into place by a crane (not shown). When positioned correctly, the payload P and transport tool 1 are essentially concentric about the longitudinal axis 2A of the payload P, although great accuracy is not required at this stage, since the payload P remains suspended from the crane, and the subsequent step of actuating the shape-adjustable adapter 10 will bring the payload P into alignment with the tool 1.

In FIG. 1, the inflatable element 10 is empty or deflated, so that it is smaller than the shape defined by the interface portion 20 of the payload P, which can be lowered into place. Here, the payload P may be a tower section weighing 100-400 tonnes or more. Once the payload P has been positioned satisfactorily, for example to rest on the pedestal 120, the pressurized air assembly 14, 15 is operated to pump air (or any other suitable gas) through a hose or tube (which may pass through the rigid body as shown here) into the inflatable element 10. The inflatable bag 10 is filled with air to a suitable pressure so that the completely inflated bag 10 presses against the inner surface 201 of the payload P. When this step is complete, the crane can be detached from the payload P.

FIG. 2 shows the transport tool 1 in its mating shape S1, showing how the tool 1 engages with the payload P. During transport, the adapter 10 ensures that the payload P is securely held. The combined effect of the weight of the payload P and the pressure within the inflated chamber 10 is sufficient to prevent slippage of the payload P relative to the adapter 10. When the vessel has arrived at the destination, the payload P can be lifted off the transport tool 1. To release the payload P from the transport tool 1, the adapter 10 is brought into its relaxed or initial state S1 by actuating the pressurized air assembly 14, 15 to release the air from the inflatable bag 10. FIG. 2 shows a further aspect of embodiments of the invention, and indicates a number of hydraulic cylinders 11 that can be operated to exert an upward force against the base of the payload P. This might be helpful if the payload P is very heavy. The release means 11 can be incorporated in the body 120 of the transport tool 1 as shown here, or could be realised as separate elements.

In the embodiment described above, the material of which the inflatable bag 10 is made may have a high coefficient of friction so that slippage of the payload 20 relative to the adapter 10 is effectively prevented. In this way, the shape-adjustable adapter 10 has a high-friction surface 101 arranged to lie against a surface 201 of the structure P. Alternatively, a sheet of material with high-friction surfaces (e.g. a rubber sheet) could be draped over the inflatable bag 10 in its deflated state before the payload P is positioned. Then, when the inflatable bag 10 is inflated to pressure, the high-friction sheet prevents slippage of the payload P relative to the transport tool 1. Such a realisation may also allow an embodiment of the transport tool 1 described above to be used for a payload that has a straight cylindrical form. When inflated completely, the inflatable bag 10 with its high-friction outer surface 101 may be sufficient to secure the payload P during transport.

Figure 3:
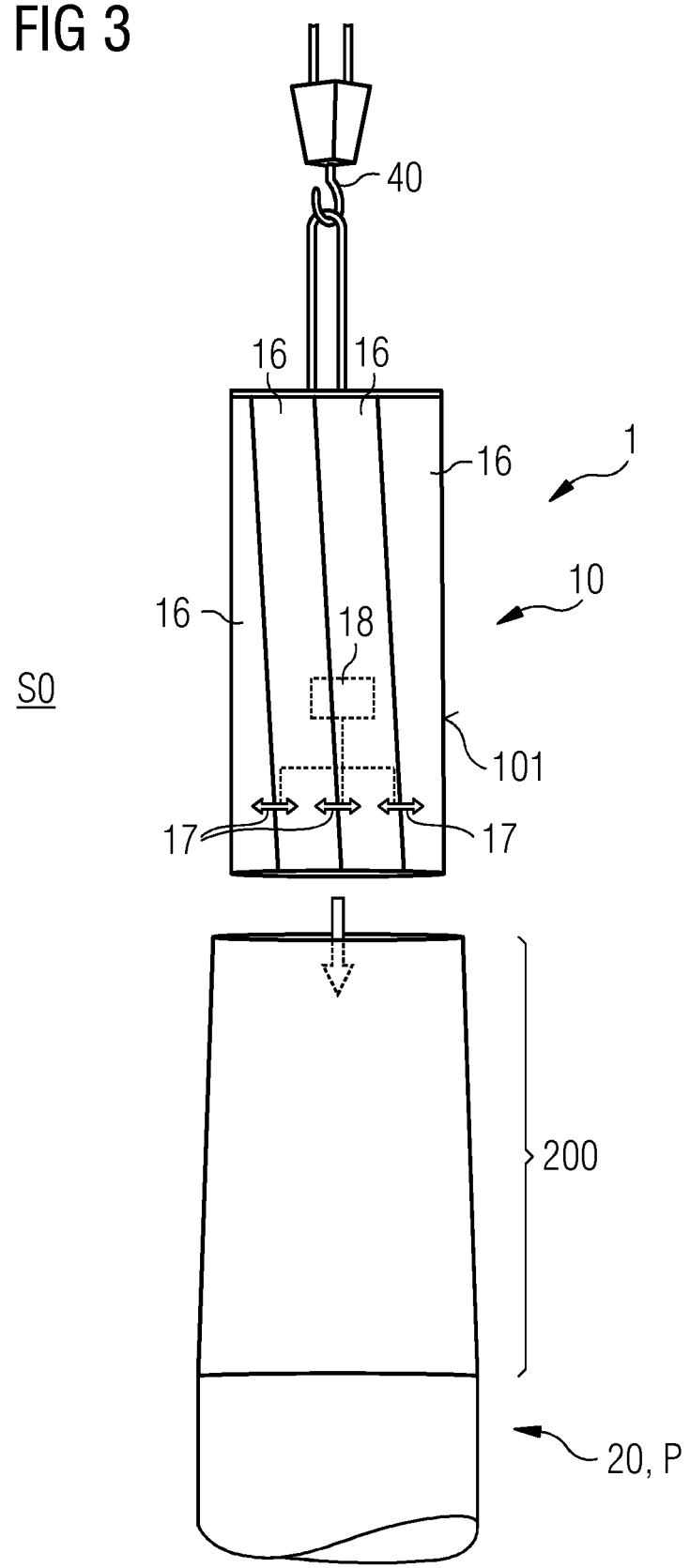
FIG. 3 is a schematic drawing showing a further embodiment of the transport tool in an initial state.
Figure 4:
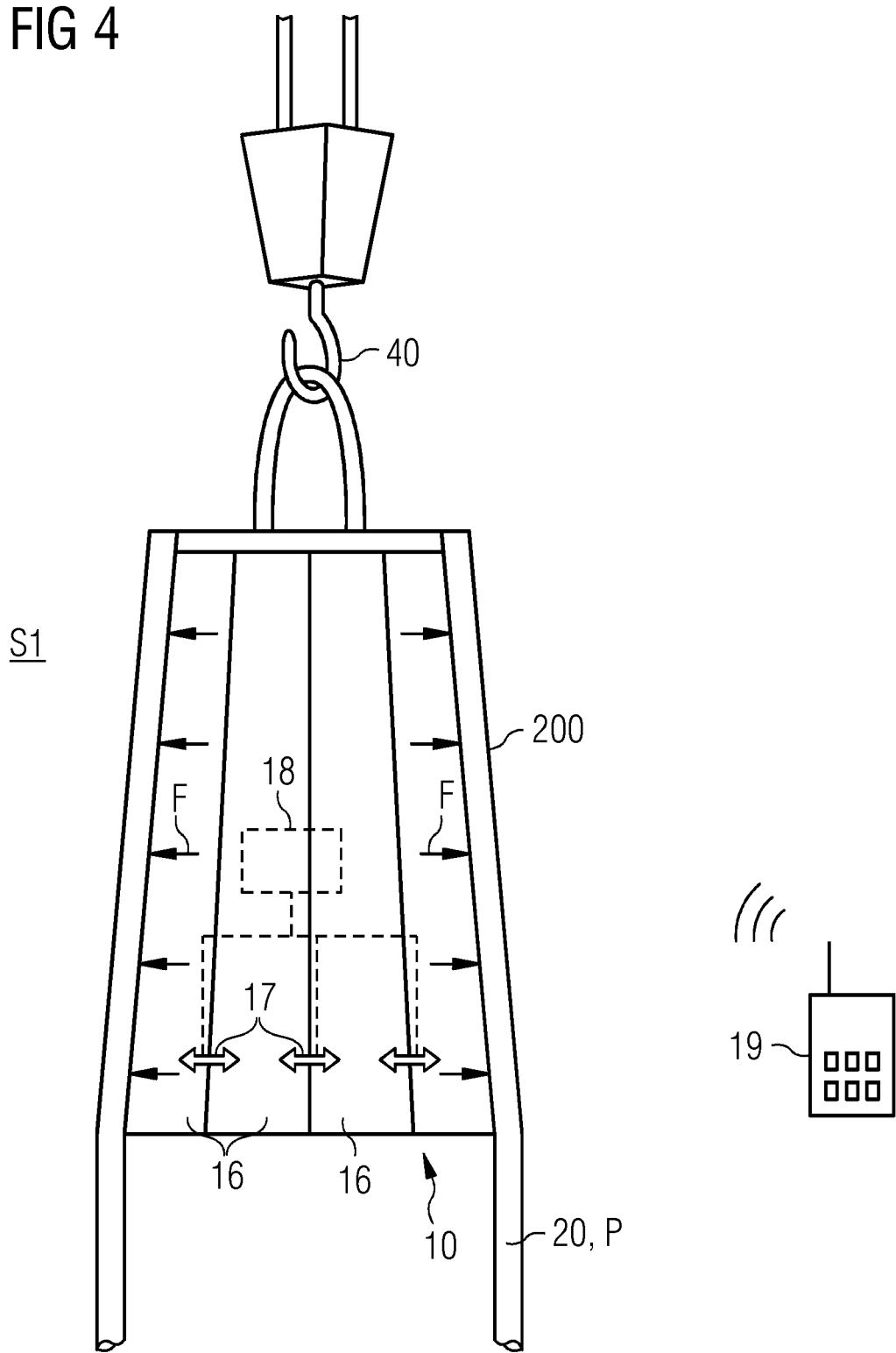
FIG. 4 is a schematic drawing showing a further embodiment of the transport tool in a mating state.

FIG. 3 and FIG. 4 are simplified schematics showing an embodiment of the inventive transport tool 1 that can be used as a lifting fitting of a crane (not shown) to transport a payload P from one location (e.g. the deck of a vessel) to another (e.g. an offshore installation site). The tool 1 can be suspended from a hook 40, for example. FIG. 3 shows the transport tool 1 in its initial shape S0, while FIG. 4 shows the tool 1 in its mating shape S1. For the purposes of illustration, the diagram also indicates the upper end of an exemplary payload P, in this case a wind turbine tower section 20 that is shaped to receive the lower end of a further wind turbine tower section by means of a slip-joint as described above. To this end, the interface portion 200 of the tower section 20 has the shape of a frustum.

FIG. 3 shows the inventive transport tool 1 in its initial shape S0 before engaging with the payload P. In this embodiment of the tool 1, the shape-adjustable adapter 10 is realised as a set of overlapping plates 16 that can be furled and unfurled to change the shape of the adapter between essentially cylindrical (FIG. 3, initial shape S0) and frusto-conical (FIG. 4, mating shape S1). The plates 16 can be connected by hydraulic linkages 17 (indicated here simply by double-headed arrows) or using any other suitable mode of construction. An actuator 18, in this case a drive motor 18, can be remotely controlled, for example from a hand-held device 19 operated by a technician on a transport vessel, to actuate the linkages 17 as required. To effect the change between initial shape S0 and mating shape 51, the actuator responds to commands received from a controller, from example a hand-held remote control device operated by a technician.

The crane is operated to lower the transport tool 1 into the interior of the tower section 20 as indicated by the downward-pointing arrow in FIG. 3. FIG. 4 shows a larger view of the transport tool 1 in its mating shape S1, illustrating how the tool 1 engages with the payload P. During the lifting sequence, the adapter 10 ensures that the payload P is securely held. The transport tool 1 is realised so that the adapter 10 exerts a sufficient force F against the surface of the payload P to prevent slippage of the payload P relative to the adapter 10. When the tower section 20 has been lowered into place at its destination, the transport tool 1 is released. To this end, the adapter 10 is brought into its relaxed or initial state S0 as shown in FIG. 3, and can easily be raised out of the tower section 20.

In the embodiment described above, the adjustable plates 16 may also be coated with a material that has a high coefficient of friction so that slippage of the payload 20 relative to the adapter 10 is effectively prevented.

In the embodiment described in FIGS. 3 and 4, the shape-adjustable adapter 10 has an essentially circular cross-section between a fixed end (in this case: the upper end) and a variable end (in this case: the lower end), and the diameter at the variable end is larger in the mating state 51 than in the initial state S0.

Figure 5:
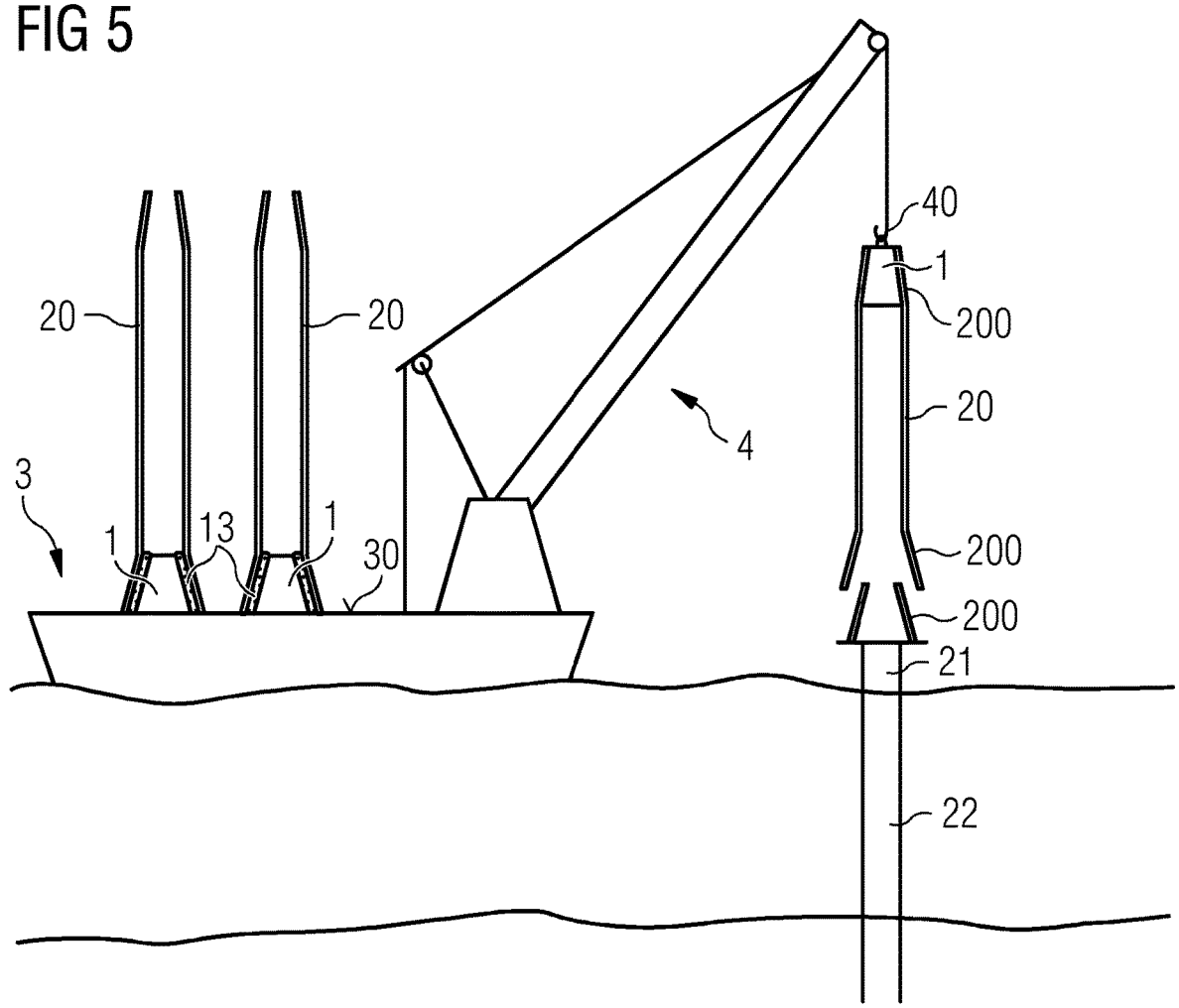
FIG. 5 shows a payload being lifted using an embodiment of the transport tool.

The embodiment described in FIGS. 1 and 2 can of course be implemented along with the embodiment of FIGS. 3 and 4, i.e. one instance of the transport tool 1 can be used to hold a payload P in place during shipping, and another instance of the transport tool 1 can be used to lift the payload P from the vessel and to its ultimate destination. FIG. 5 is a highly simplified schematic to illustrate an installation procedure, and shows a transition piece 21 of an offshore wind turbine foundation 22, and a tower 20 (or tower section) being lifted from the vessel 3 towards the transition piece 21. The diagram shows further towers 20 still in place on further instances of the transport tool 1 mounted as fixtures on the deck of the installation vessel 3. For the purposes of illustration, the towers 20 and the interface portion 200 of transition piece 21 are shown as cross-sections.

Figure 6:
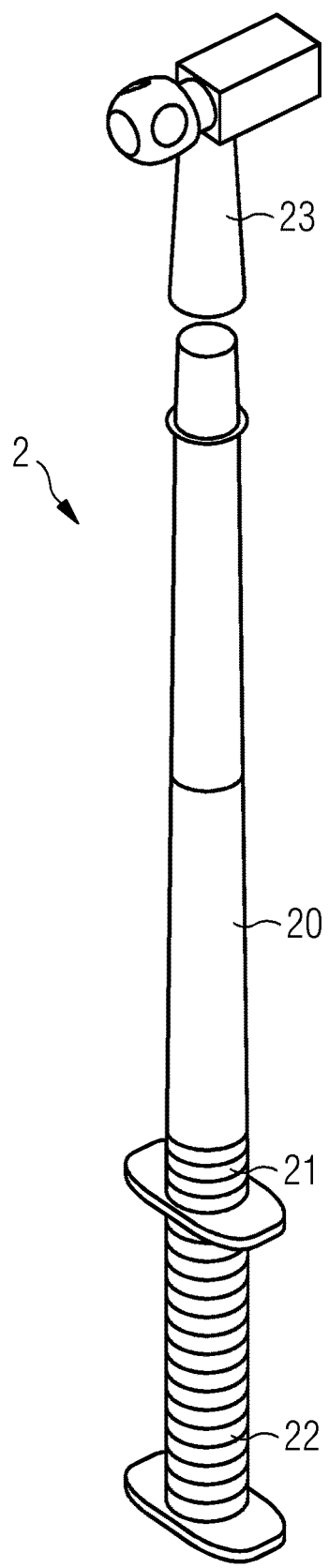
FIG. 6 is a schematic drawing of a partially assembled wind turbine.

FIG. 6 is a simplified schematic of a partially assembled wind turbine 2. The diagram shows a marine foundation 22, a transition piece 21, a tower 20, and a nacelle 23. In the diagram, the nacelle 23 is being lowered onto the upper end of the tower 20 by a crane (not shown). The transition piece 21 is connected to the tower 20 by a slip joint. The transition piece 21 can have been lowered into place at the installation site using an instance of the inventive transport tool, for example as explained in FIG. 3 and FIG. 4 above. The tower 20 can have been transported as a single unit (or in two sections as indicated here) to the installation site using an instance of the inventive transport tool, for example as explained in FIG. 1 and FIG. 2 above, and can have been lowered into place onto the transition piece 21 using an instance of the inventive transport tool, for example as explained in FIG. 3 and FIG. 4 above. Similarly, the nacelle 23 can have been transported to the installation site using an instance of the inventive transport tool as explained in FIG. 1 and FIG. 2 above, for example on the same vessel 3 that was used to transport the tower 20, and can have been lowered into place onto the tower 20 as explained in FIG. 3 and FIG. 4 above. The diagram illustrates the various applications for the inventive transport tool 1 in the transport and assembly of a large structure from different parts, each with specific transport requirements.

The transport tool is particularly suited for use with any structure that has a slip-joint interface. The embodiments described above show interface portions that have an overall frustum shape. This is not strictly necessary, and a payload or structure may have an overall straight cylindrical form, but with a raised ring about its exterior (or interior) of the cylinder, with a slanted outer face, i.e. a conical contact face whose upper diameter is smaller than its lower diameter (or vice versa). The inventive transport tool can also engage with such a structure since the shape-adjusting adapter can press against the conical contact face of the raised ring. Furthermore, the transport tool is not limited to use with payloads that have an essentially circular cross-section, and can of course be used with any payload shape. With appropriate design and construction, the inventive transport tool can be used in conjunction with payloads having a non-circular cross-section, for example an irregular or regular polygonal cross-section.

Although embodiments of the present invention has been disclosed in the form of exemplary embodiments and variations thereon, it will be understood that numerous additional modifications and variations could be made thereto without departing from the scope of embodiments of the invention. For example, although the payloads described above have a hollow frustoconical slip-joint interface portion, the transport tool could be used to engage with a payload that is not hollow, by constructing the transport tool to engage with the exterior surface(s) of the payload. The inventive transport tool can be constructed to adjust to various payload shapes, thereby contributing to a significant reduction in costs, since the multifunction tool can be used in place of several differently dimensioned installation tools from project to project.

The inventive transport tool can be used for the installation of various different types of components such as foundations (monopile foundations, transition pieces, gravity foundations, tripod foundations, jacket foundations, floating foundations); towers with various diameters; and any other component or payload that requires transportation as explained above.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A transport apparatus for use in the transport of a heavy structure, the transport apparatus comprising:
a shape-adjustable adapter configured to adjust between an initial shape and a mating shape; and
an actuator configured to:
affect a change in shape of the shape-adjustable adapter into the initial shape to facilitate positioning of the shape-adjustable adapter relative to the heavy structure, and
affect a change in shape of the shape-adjustable adapter into the mating shape to engage the shape-adjustable adapter with a surface of the heavy structure;
wherein the shape-adjustable adapter has an essentially circular cross-section between a fixed end and a variable end, further wherein a diameter at the variable end is larger in the mating state than in the initial state.

2. The transport apparatus according to claim 1, wherein the shape-adjustable adapter comprises a high-friction surface arranged to lie against the surface of the heavy structure.

3. The transport apparatus according to claim 1, wherein the shape-adjustable adapter comprises a plurality of plates linked together, further wherein the transport apparatus further comprises an actuator-controlled mechanism for moving the plurality of linked plates between the initial shape and the mating shape.

4. The transport apparatus according to claim 1, wherein the shape-adjustable adapter comprises an inflatable mantle configured to assume the initial shape when deflated, and to assume the mating shape when inflated.

5. The transport apparatus according to claim 1, a mechanism configured to effect the change in shape of the shape-adjustable adapter between the initial shape and the mating shape.

6. The transport apparatus according to claim 1, wherein the transport apparatus is a lifting fitting of a lifting apparatus.

7. The transport apparatus according to claim 1, wherein the transport apparatus is a fixture mounted on a deck of a transport vessel.

8. The transport apparatus according to claim 1, comprising a release means configured to assist in releasing the heavy structure from the transport apparatus.

9. The transport apparatus according to claim 1, wherein the transport apparatus is configured for use in the transport of a frustoconical structure, further wherein the mating shape of the shape-adjustable adapter is essentially frustoconical.

10. The transport apparatus according to claim 9, wherein the shape-adjustable adapter in the initial state is smaller than an interior volume of the frustoconical structure.

11. A method of securing a structure during transport, the method comprising:

providing the transport apparatus according to claim 1;
controlling the actuator to effect a change in shape of the shape-adjustable adapter into the initial shape;
positioning the adapter relative to the structure; and
engaging the shape-adjustable adapter with the structure by controlling the actuator to effect the change in shape of the shape-adjustable adapter into the mating shape.

12. The method according to claim 11, wherein the step of providing the transport apparatus comprises a step of mounting the transport apparatus as a fixture onto a deck of a transport vessel.

13. The method according to claim 11, wherein the step of providing the transport apparatus comprises a step of suspending the transport apparatus from a lifting assembly.

14. The method according to claim 11, comprising a step of controlling the actuator to effect the change in shape of the shape-adjustable adapter into the initial shape to release the shape-adjustable adapter from the structure.

\* \* \* \* \*